United States Patent
Williams (10) Patent No.: US 11,628,873 B2
(45) Date of Patent: Apr. 18, 2023

(54) APPARATUS FOR ADAPTING A SINGLE-TRACK VEHICLE TO A CHAIRLIFT

(71) Applicant: Daniel J. Williams, Driggs, ID (US)

(72) Inventor: Daniel J. Williams, Driggs, ID (US)

(*) Notice: Subject to any disclaimer, the term of this patent is extended or adjusted under 35 U.S.C. 154(b) by 332 days.

(21) Appl. No.: 16/804,362

(22) Filed: Feb. 28, 2020

(65) Prior Publication Data
US 2020/0277000 A1 Sep. 3, 2020

Related U.S. Application Data

(60) Provisional application No. 62/811,815, filed on Feb. 28, 2019.

(51) Int. Cl.
| | | |
|---|---|---|
| *B62B 13/00* | (2006.01) | |
| *B62B 13/04* | (2006.01) | |
| *B62B 17/06* | (2006.01) | |
| *B62B 17/04* | (2006.01) | |

(52) U.S. Cl.
CPC ............ *B62B 13/005* (2013.01); *B62B 13/04* (2013.01); *B62B 17/063* (2013.01); *B62B 17/04* (2013.01)

(58) Field of Classification Search
CPC ..... B62B 13/005; B62B 13/04; B62B 17/063; B62B 17/04; B61B 12/002
See application file for complete search history.

(56) References Cited

U.S. PATENT DOCUMENTS

| | | | | |
|---|---|---|---|---|
| 6,783,134 B2* | 8/2004 | Geary | ..................... | B62B 13/16 |
| | | | | 280/22.1 |
| 8,398,094 B1* | 3/2013 | Kolesar | ................. | B61B 11/008 |
| | | | | 280/14.28 |
| 2008/0029324 A1* | 2/2008 | Plankenhorn | ........... | B62B 13/08 |
| | | | | 280/22.1 |
| 2009/0140503 A1* | 6/2009 | Kolesar | ................. | B61B 11/008 |
| | | | | 104/173.2 |
| 2010/0109267 A1* | 5/2010 | Leycraft | ................. | B62B 13/04 |
| | | | | 280/21.1 |
| 2017/0015344 A1* | 1/2017 | Rapp | ..................... | B62B 13/043 |

FOREIGN PATENT DOCUMENTS

| | | | | |
|---|---|---|---|---|
| CA | 2537619 A1 * | 8/2007 | ........... | B61B 11/004 |
| EP | 3656450 A1 * | 5/2020 | ........... | A63C 11/001 |

* cited by examiner

*Primary Examiner* — James A Shriver, II
*Assistant Examiner* — Michael T. Walsh
(74) *Attorney, Agent, or Firm* — Heath M. Sargeant; Holland & Knight LLP (57) ABSTRACT

An apparatus for adapting a single-track vehicle for use on a chairlift is provided. A first adapter portion may be configured to be removably coupled to at least a portion of a single-track vehicle. A second adapter portion may be pivotably coupled to the first adapter portion. A space formed between the first adapter portion and the second adapter portion may be configured to receive at least a portion of a chairlift seat of a chairlift.

16 Claims, 10 Drawing Sheets

APPARATUS FOR ADAPTING A SINGLE-TRACK VEHICLE TO A CHAIRLIFT

RELATED APPLICATION

This application claims the benefit of U.S. Provisional Application No. 62/811,815, filed on 28 Feb. 2019; the contents of which are incorporated herein by reference.

TECHNICAL FIELD

The present disclosure generally relates to single-track vehicles, and more particularly relates to an apparatus for adapting a single track vehicle to a chairlift.

BACKGROUND

Many single-track vehicles have been introduced to allow riders with physical disabilities and/or limitations to enjoy various indoor and outdoor activities. For example, riders may enjoy the thrill of skiing by using a single-track vehicle such as a ski bicycle. However, these single-track vehicles are often limited from being used in conjunction with other vehicles, such as aerial lifts. Additionally, users with physical disabilities may be unable to use adaptive single-track vehicles with aerial lifts.

SUMMARY

In an embodiment, an apparatus may include a first adapter portion configured to be removably coupled to at least a portion of a single-track vehicle. A second adapter portion may be pivotably coupled to the first adapter portion. A space formed between the first adapter portion and the second adapter portion may be configured to receive at least a portion of a chairlift seat of a chairlift.

One or more of the following features may be included. A shock absorber may be positioned between the first adapter portion and the second adapter portion. The shock absorber may be configured to maintain the second adapter portion at an angular position relative to the first adapter portion. A first surface of the second adapter portion may be configured to be coupled to a removably coupleable saddle. The at least a portion of the chairlift seat may be configured to be received underneath a second surface of the second adapter portion. The single-track vehicle may be a ski bicycle. A first end of the second adapter portion may be pivotably coupled to a first end of the first adapter portion. The at least a portion of the chairlift seat may be configured to be received in a space formed between a second end of the first adapter portion and a second end of the second adapter portion. The chairlift may be configured to lift the single-track vehicle by the combination of the first adapter portion and the second adapter portion. The first adapter portion may be removably coupleable to the at least a portion of the single-track vehicle via one or more fasteners associated with the first adapter portion.

According to another implementation, an adapter system for adapting a single-track vehicle for use on a chairlift may include a first adapter portion configured to be removably coupled to at least a portion of the single-track vehicle. A second adapter portion may be pivotably coupled to the first adapter portion. A shock absorber may be positioned between the first adapter portion and the second adapter portion. A space formed between the first adapter portion and the second adapter portion may be configured to receive at least a portion of a chairlift seat of the chairlift.

One or more of the following features may be included. The shock absorber may be configured to maintain the second adapter portion at an angular position relative to the first adapter portion. A first surface of the second adapter portion may be configured to be coupled to a removably coupleable saddle. The at least a portion of the chairlift seat may be configured to be received underneath a second surface of the second adapter portion. The single-track vehicle may be a ski bicycle. A first end of the second adapter portion may be pivotably coupled to a first end of the first adapter portion. The at least a portion of the chairlift seat may be configured to be received in a space formed between a second end of the first adapter portion and a second end of the second adapter portion. The chairlift may be configured to lift the single-track vehicle by the combination of the first adapter portion and the second adapter portion. The first adapter portion may be removably coupleable to the at least a portion of the single-track vehicle via one or more fasteners associated with the first adapter portion.

According to yet another implementation, an adapter system for adapting single-track vehicles for use on a chairlift may include a first adapter portion configured to be removably coupled to at least a portion of a ski-bicycle. A first end of a second adapter portion may be pivotably coupled to a first end of the first adapter portion. A space formed between a second end of the first adapter portion and a second end of the second adapter portion may be configured to receive at least a portion of a chairlift seat of the chairlift.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF EXAMPLE EMBODIMENTS

In general, consistent with the present disclosure, a single-track vehicle may be adapted for use on chairlifts. For example, various single-track vehicles may be used for skiing, mountain biking, etc. in areas with chairlifts. Generally, chairlifts do not have the ability to transport a single-track vehicle. Embodiments of the present disclosure may allow a single-track vehicle to be removably secured to a chair lift via an adapter system. As will be discussed in greater detail below, the adapter system may comprise a first adapter portion and a second adapter portion pivotably coupled to the first adapter portion. The first adapter portion may be removably coupled to at least a portion of a single-track vehicle. In some embodiments, at least a portion of a chairlift seat or chair may be received in a space formed between the first adapter portion and the second adapter portion to enable the chairlift to removably couple the single-track vehicle to the chairlift seat and to transport the single-track vehicle. In this manner, a rider may utilize a chairlift with a single-track vehicle.

Figure 1:
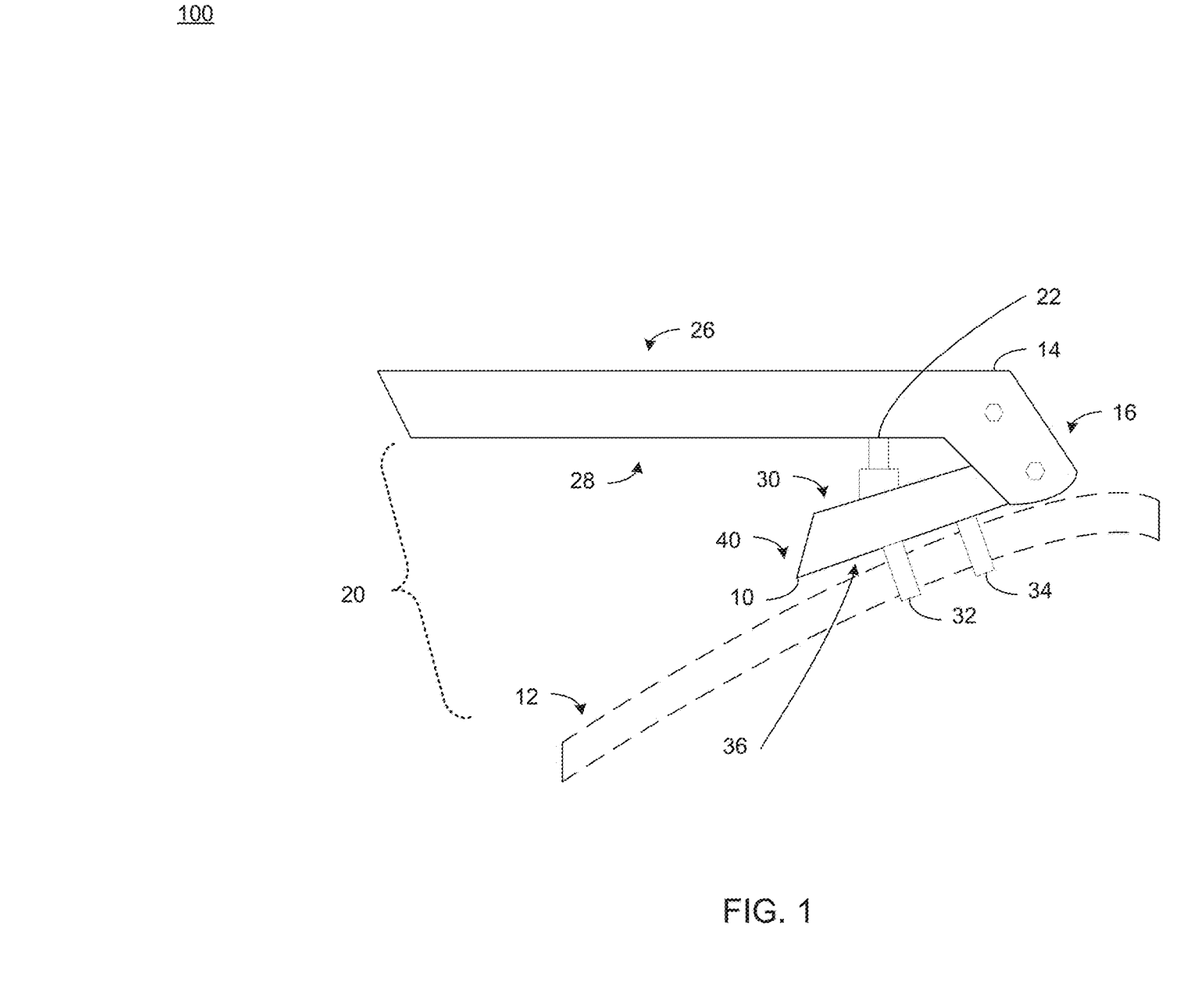
FIG. 1 is a side elevation view of an adapter system, according to an example embodiment.

For example, and referring generally to FIGS. 1 through 10, in an embodiment, a first adapter portion (e.g., first adapter portion 10) may be configured to be removably coupled to at least a portion of a single-track vehicle (e.g., single-track vehicle 12). A second adapter portion (e.g., second adapter portion 14) may be pivotably coupled to the first adapter portion (e.g., first adapter portion 10). In the example of FIG. 1, second adapter portion (e.g., second adapter portion 14) may be pivotably coupled to the first adapter portion (e.g., first adapter portion 10) at a pivot point (e.g., pivot 16) formed between the first adapter portion and the second adapter portion. In some embodiments, at least a portion of a chairlift seat (e.g., chairlift seat 18) of a chairlift may be configured to be received in a space (e.g., space 20) formed between the first adapter portion (e.g., first adapter portion 10) and the second adapter portion (e.g., second adapter portion 14). In various embodiments, the first adapter portion and/or the second adapter portion may be formed from any suitable material, including, but not limited to, metal(s), metal alloy(s), synthetic products, etc. Further, the first adapter portion and the second adapter portion may be formed from the same material, and/or may be formed from different materials.

In some embodiments, a first end of the second adapter portion may be pivotably coupled to a first end of the first adapter portion. Referring also to the example of FIG. 1, the first end of the second adapter portion may include an end of the second adapter portion adjacent to a pivot point (e.g., pivot point 16). In the example of FIG. 1, the first end of the first adapter portion may include an end of the first adapter portion adjacent to the pivot point (e.g., pivot point 16).

Figure 2:
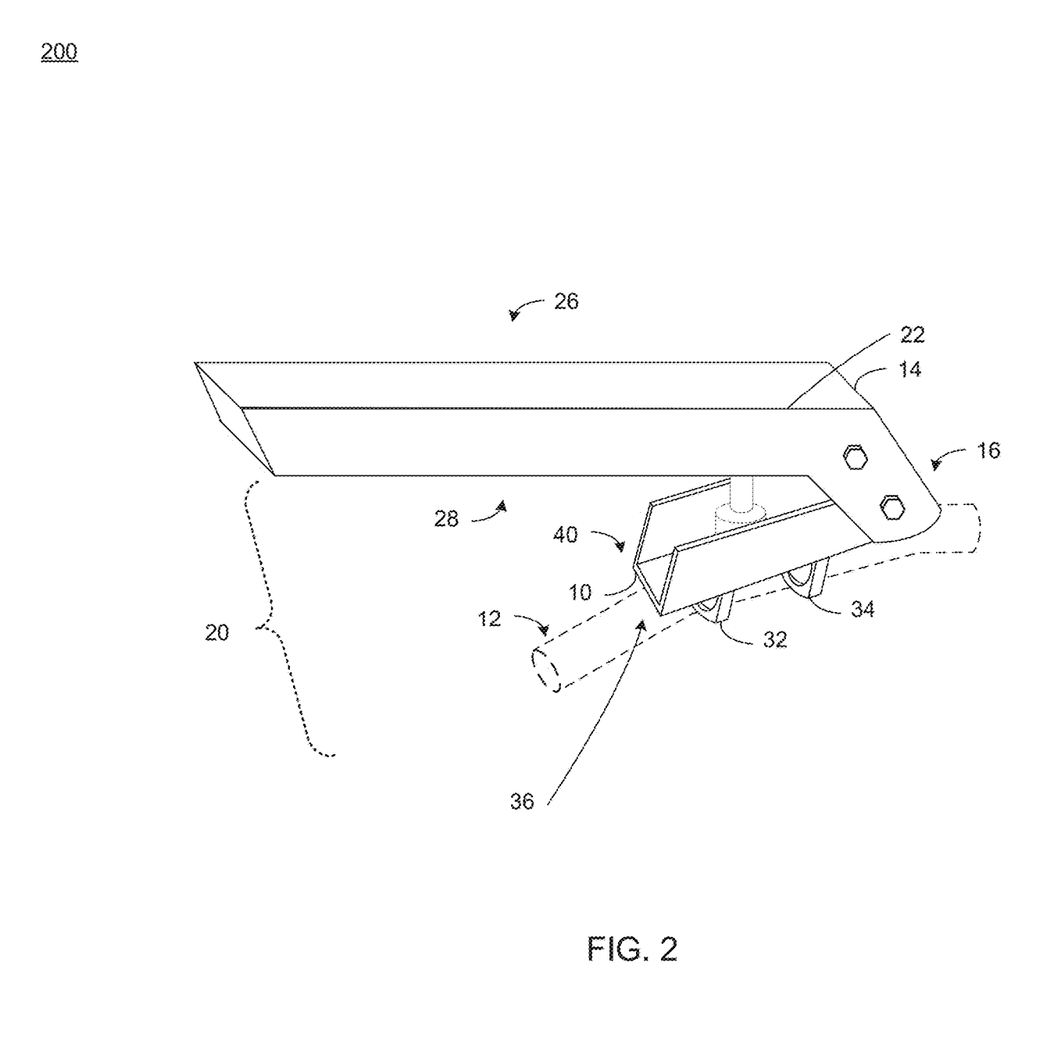
FIG. 2 is a perspective view of an adapter system, according to an example embodiment.
Figure 3:
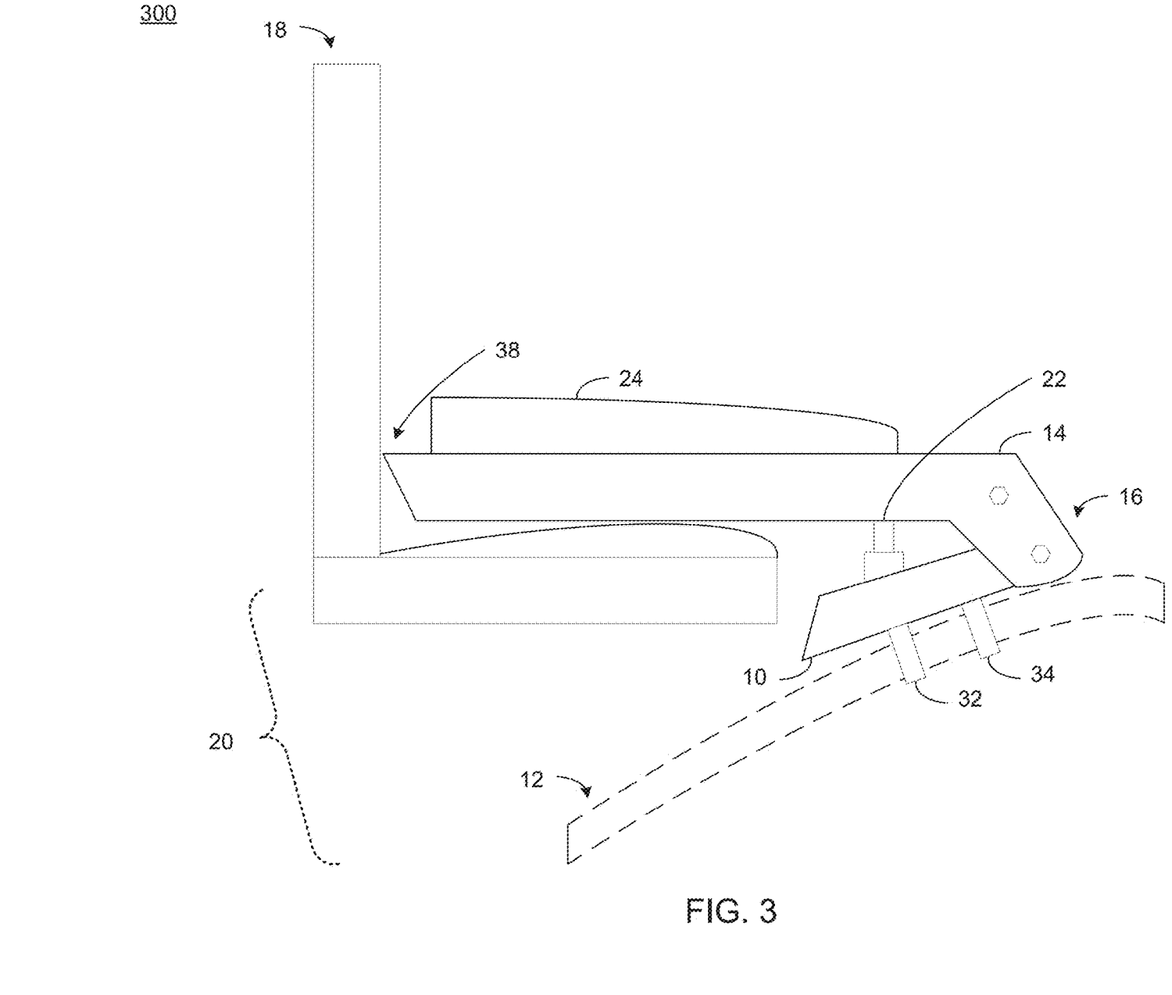
FIG. 3 is a side elevation view of an adapter system, according to an example embodiment.
Figure 4:
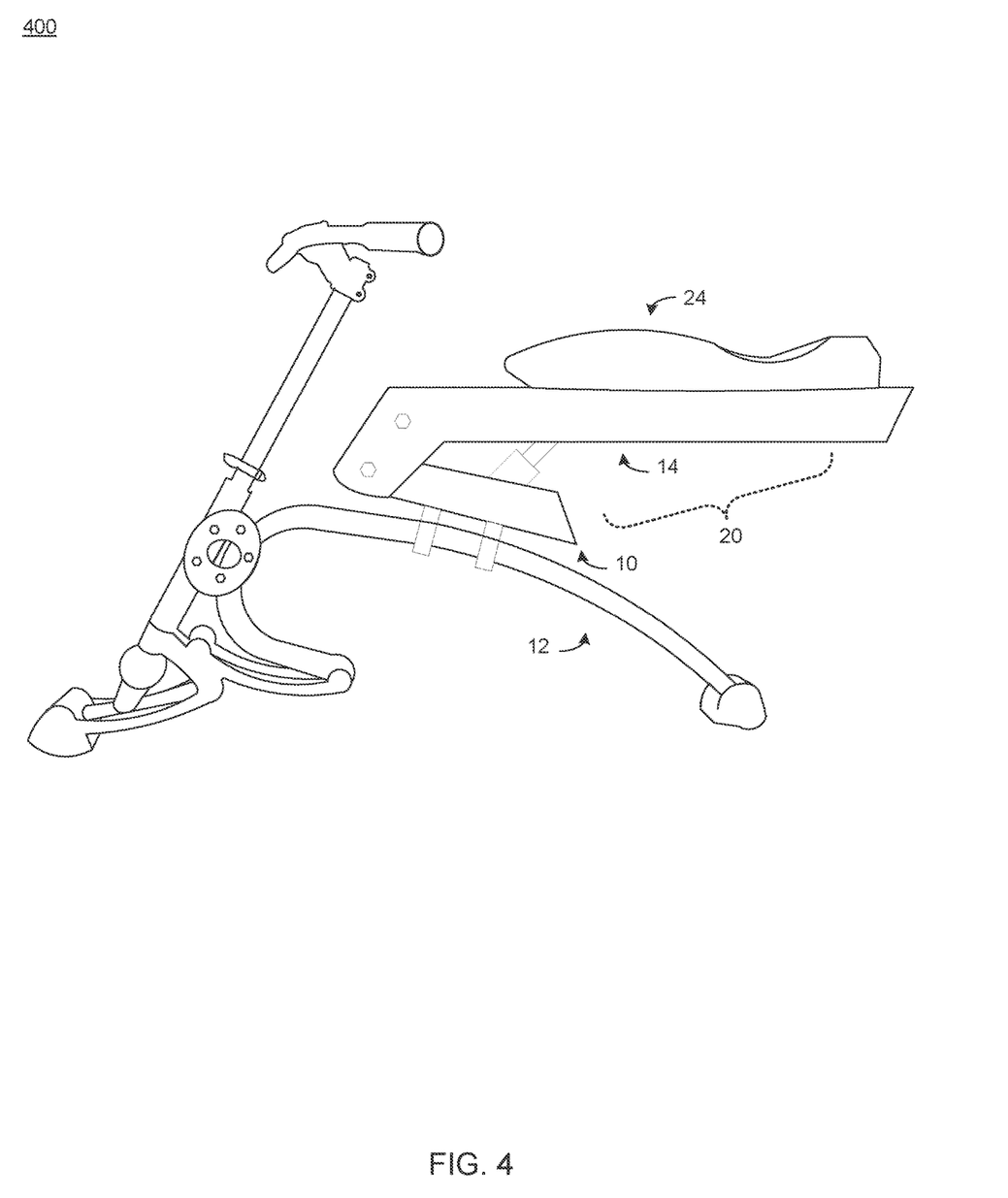
FIGS. 4-5 are diagrammatic views of an adapter system installed on a single-track vehicle, according to an example embodiment.
Figure 5:
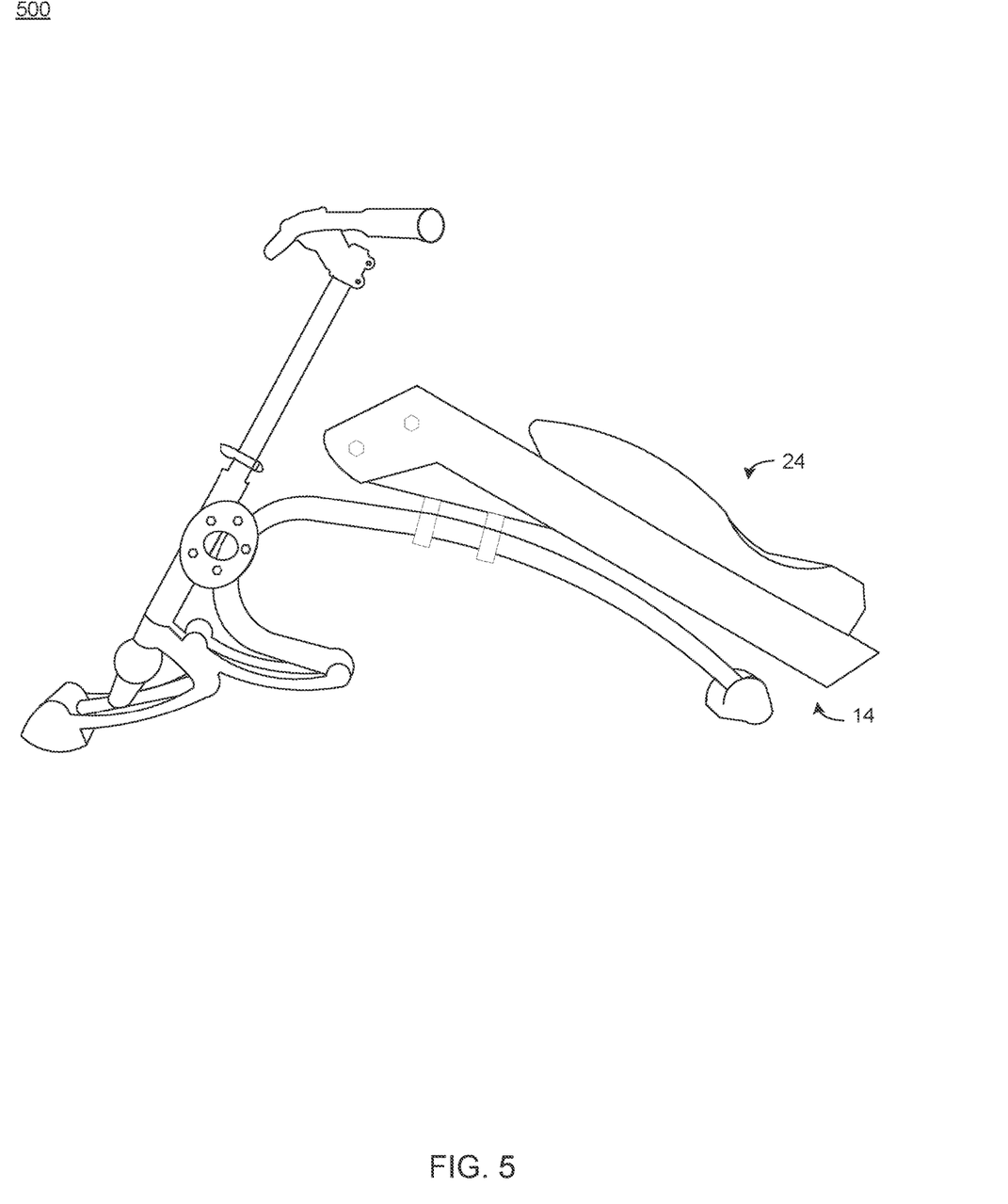
Figure 6:
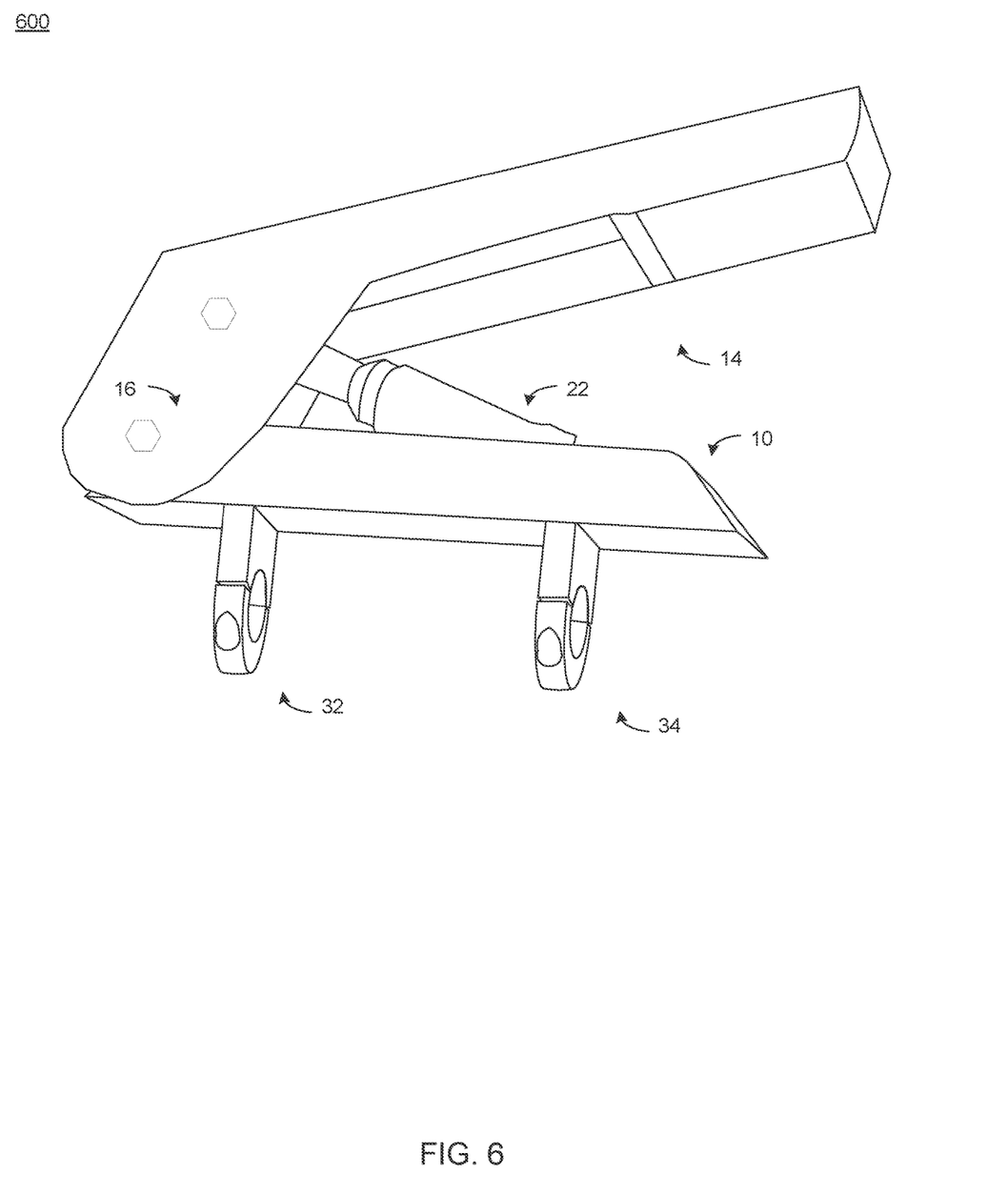
FIG. 6 is a diagrammatic view of an adapter system, according to an example embodiment.
Figure 7:
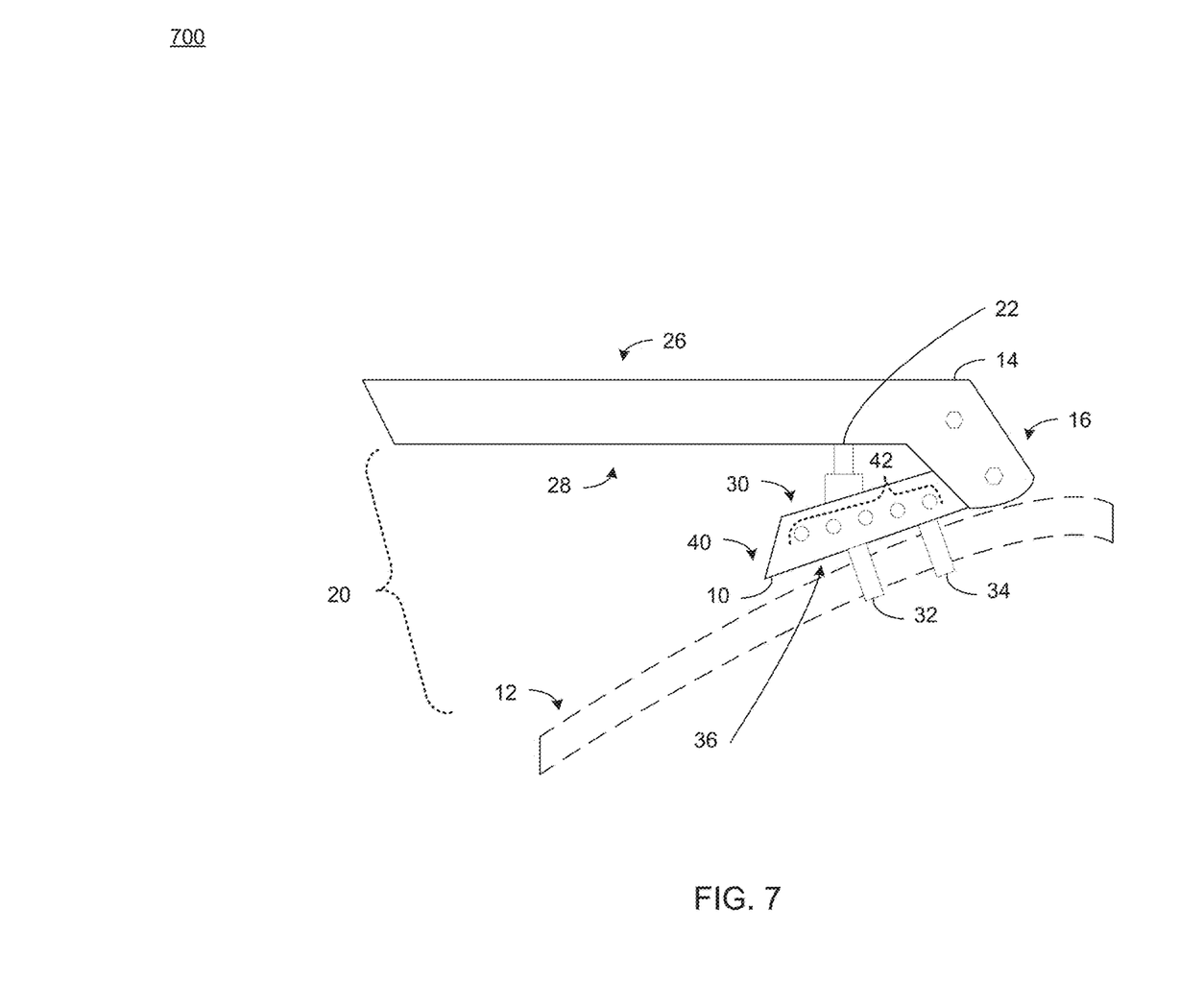
FIG. 7 is a side elevation view of an adapter system, according to an example embodiment.
Figure 8:
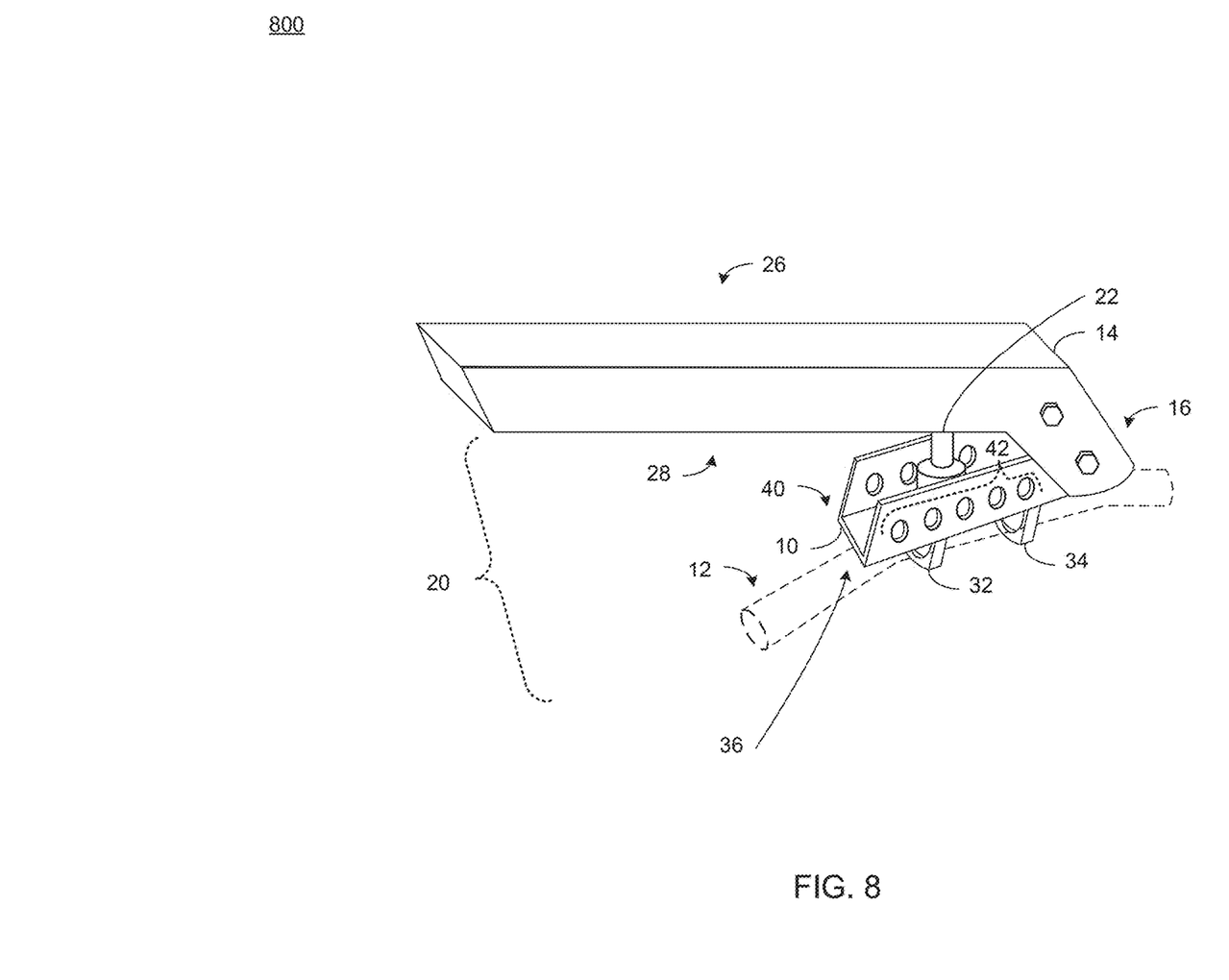
FIG. 8 is a perspective view of an adapter system, according to an example embodiment.
Figure 9:
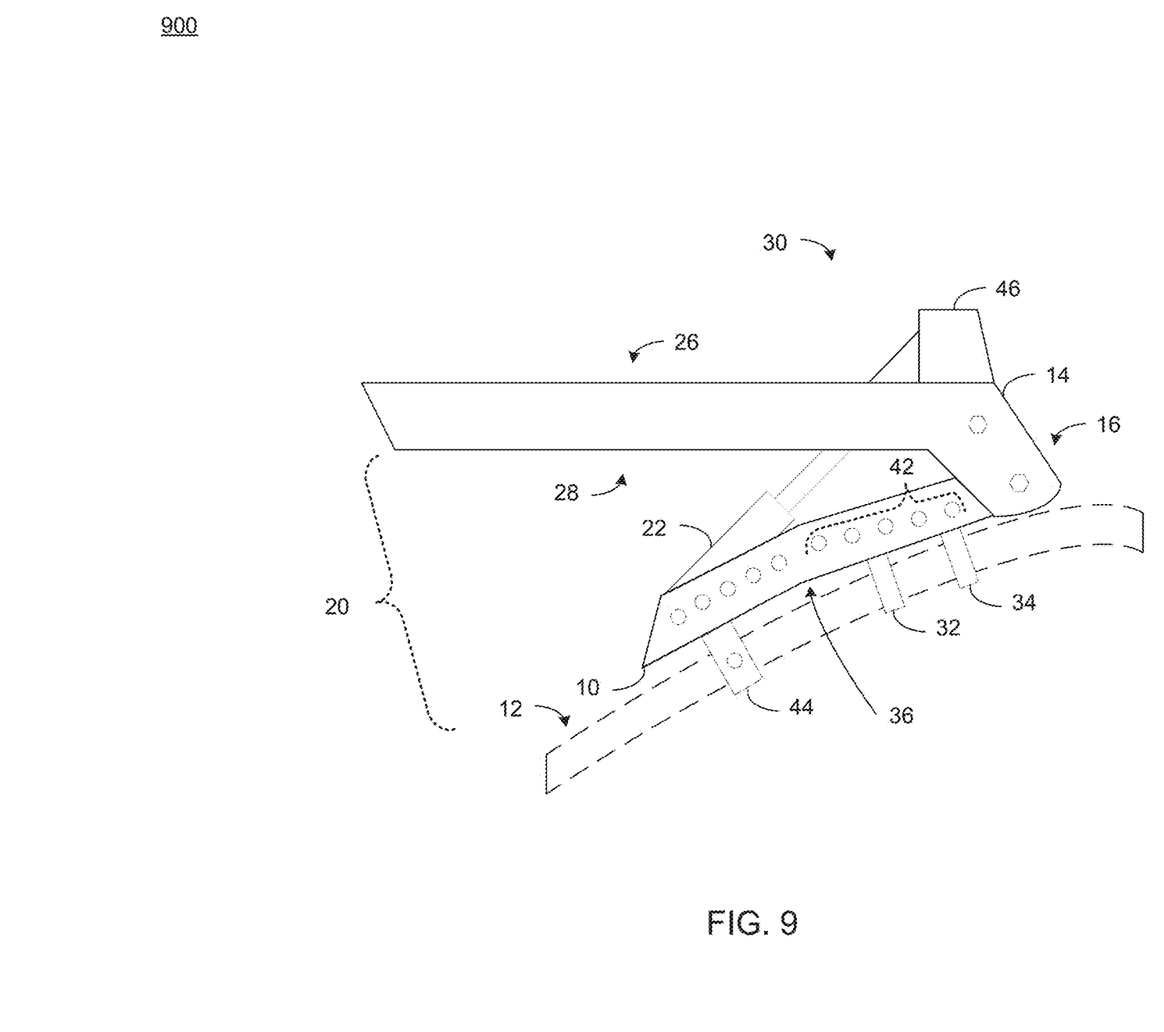
FIG. 9 is a side elevation view of an adapter system, according to an example embodiment.
Figure 10:
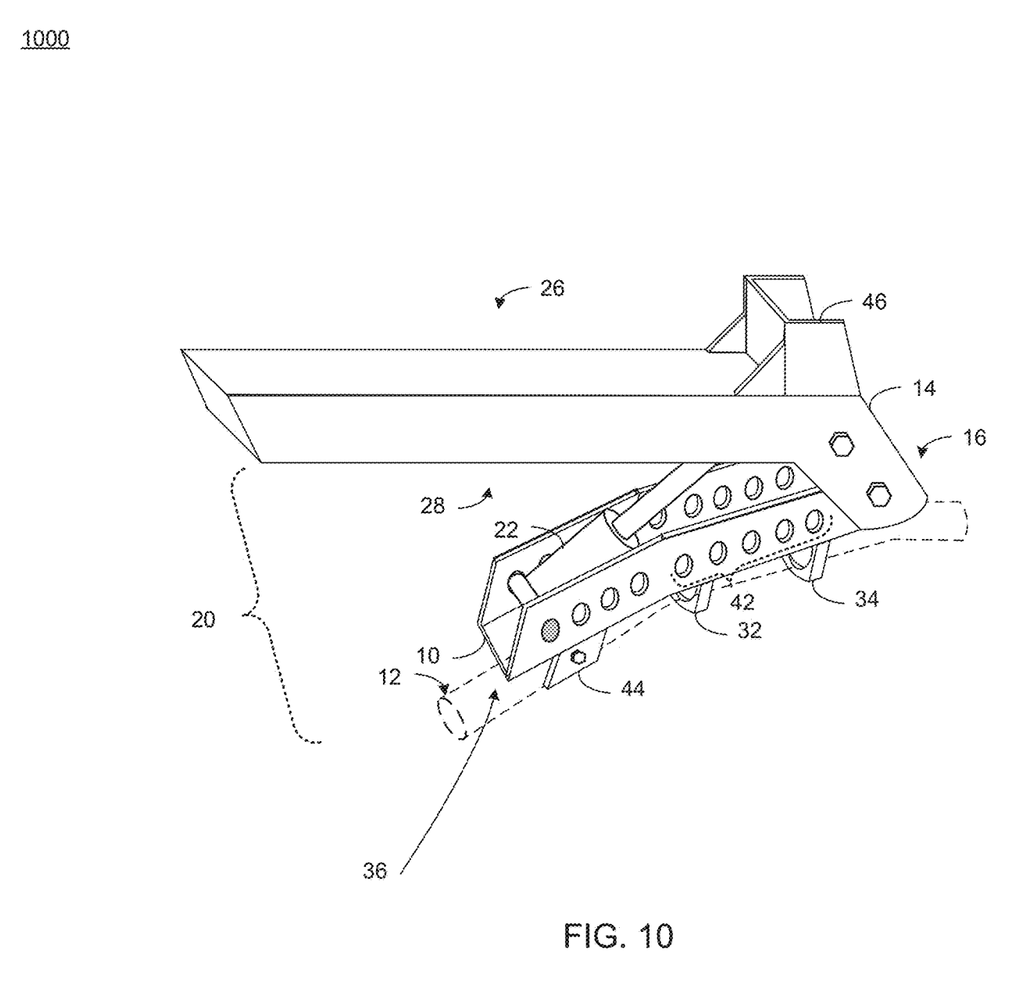
FIG. 10 is a perspective view of an adapter system, according to an example embodiment.

In some embodiments, a shock absorber (e.g., shock absorber 22) may be positioned between the first adapter portion (e.g., first adapter portion 10) and the second adapter portion (e.g., second adapter portion 14). As is known in the art, a shock absorber may be a mechanical or hydraulic device with one or more spring elements and one or more damping elements designed to absorb and damp shock impulses. In some embodiments, the shock absorber (e.g., shock absorber 22) may be configured to maintain the second adapter portion (e.g., second adapter portion 14) at a pre-defined angular position relative to the first adapter portion (e.g., first adapter portion 10). For example, shock absorber 22 may be configured to hold second adapter portion 14 at a pre-defined angle relative to first adapter portion 10 and/or a pre-defined angle relative to the ground. In some embodiments, the pre-defined angle may be adjustable (e.g., by a user, based on the selection of a shock absorber, etc.). In some implementations, shock absorber 22 may be oriented generally perpendicularly with second adapter portion (e.g., as shown in FIGS. 1-3 and 7-8) or may be oriented at an angle (e.g., as shown in FIGS. 6 and 9-10). As shown in the example of FIG. 2 and in some embodiments, first adapter portion 10 may include a recess or channel portion configured to receive shock absorber 22. In some embodiments, shock absorber 22 may be secured to first adapter portion 10 via one or more fasteners on a first end and to second adapter portion 14 via one or more fasteners on a second end, opposite the first end. As will be discussed in greater detail below, it will be appreciated that shock absorber 22 may be positioned in various locations and in different configurations between and relative to first adapter portion 10 and second adapter portion 14.

In some embodiments, a first surface of the second adapter portion may be configured to be coupled to a removably coupleable saddle or seating apparatus. Referring again to the example of FIG. 2 and in some embodiments, a removably coupleable saddle (e.g., saddle 24) may be coupled to a first or upper surface (e.g., first surface 26) of the second adapter portion (e.g., second adapter portion 14). In some embodiments, the removably coupleable saddle (e.g., saddle 24) may be secured to the first surface of the second adapter portion via one or more fasteners (e.g., bolts, screws, etc.). In one embodiment, a conventional single-track vehicle 12 may be modified for use with chairlifts. In this example embodiment, a saddle may be removed from the single-track vehicle and removably installed or coupled on first surface 26 of second adapter portion 14.

In some embodiments, the at least a portion of the chairlift seat may be configured to be received underneath a second surface of the second adapter portion. Referring also to the example of FIG. 3 and in some embodiments, a portion of chairlift seat 18 may be received underneath second surface 28 of second adapter portion 14 in space 20 defined between second surface 28 of second adapter portion 14 and first surface 30 of first adapter portion 10. As will be discussed in greater detail below, chairlift 18 may press against second surface 28 of second adapter portion 14 to lift single-track vehicle 12.

In some embodiments, the first adapter portion may be removably coupled to the at least a portion of the single-track vehicle via one or more fasteners (e.g., fasteners 32, 34) associated with and/or incorporated into the first adapter portion. In some implementations, the first adapter portion may be removably coupled to a top tube of a single-track vehicle (e.g., single-track vehicle 12). However, it will be appreciated that the first adapter portion may be removably secured to various portions of a single-track vehicle. In some embodiments, the one or more fasteners may be positioned on a second surface of the first adapter portion. Referring also to the example of FIG. 1 and in some implementations, fasteners 32, 34 may be positioned on second surface 36 of first adapter portion 10. In this example, fasteners 32, 34 may be removably coupled to a top tube of single-track vehicle 12. As shown in the examples of FIG. 6, fasteners 32, 34 may be clamping fasteners configured to clamp and tighten around a portion of the single-track vehicle. However, it will be appreciated that other types of fasteners may be used within the scope of the present disclosure to removably couple the first adapter portion to a portion of a single-track vehicle.

In some embodiments and referring also to FIGS. 9-10, first adapter portion 10 may include a fixed attachment point (e.g., fixed attachment point 42) for coupling to a pre-drilled attachment point or hole of the top tube of single-track vehicle 12. In this manner, fixed attachment point 42 may help facilitate consistent coupling to single-track vehicle 12. For example, suppose that fasteners 32 and 34 are clamping fasteners configured to clamp and tighten around e.g., a circular top tube of single-track vehicle 12. It will be appreciated that coupling the first adapter portion to the circular top tube of single-track vehicle 12 via clamping fasteners may result in the first adapter portion being coupled e.g., non-perpendicularly relative to the ground. In this instance, a rider may undesirably lean horizontally one way or another while riding single-track vehicle 12. By utilizing fixed attachment point 42 and a pre-drilled attachment point or hole in the top tube of single-track vehicle 12 in combination with fasteners 32 and 34, the first adapter portion may be consistently coupled to the single-track vehicle perpendicularly relative to the ground. While an example of one fixed attachment point has been described, it will be appreciated that any number of fixed attachment points may be utilized within the scope of the present disclosure.

In some embodiments, the at least a portion of the chairlift seat may be configured to be received in a space formed between a second end of the first adapter portion and a second end of the second adapter portion. Referring again to the example of FIG. 2, chairlift seat 18 may be configured to be received in space 20 formed between second end 38 of second adapter portion 14 and second end 40 of first adapter portion 10. In some embodiments, the chairlift seat (e.g., chairlift seat 18) may be configured to lift the single-track vehicle by the combination of the first adapter portion and the second adapter portion. As shown in FIG. 2, chairlift seat 18 may be configured to press against second surface 28 of second adapter portion 14. In this manner, chairlift seat 18 may lift single-track vehicle 12 via the combination of first adapter portion 10 and second adapter portion 14.

As discussed above and in some embodiments, a shock absorber (e.g., shock absorber 22) may be positioned between the first adapter portion (e.g., first adapter portion 10) and the second adapter portion (e.g., second adapter portion 14) in various positions and/or at various angles relative to the first adapter portion (e.g., first adapter portion 10) to maintain the second adapter portion (e.g., second adapter portion 14) at a pre-defined angular position relative to the first adapter portion (e.g., first adapter portion 10).

Referring also to the example of FIGS. 7-10 and in some embodiments, first adapter portion 10 may include various shock absorber mounting holes (e.g., shock absorber mounting holes 44) to position a shock absorber in various positions and at various angles relative to first adapter portion 10. In this example, a first end of shock absorber 22 may be coupled to first adapter portion via, at least in part, a pin, bolt, or other fastener configured to extend between and at least partially through shock absorber mounting holes on opposite sides of first adapter portion 10. In some embodiments, a second end of shock absorber 22 may be coupled to a fixed portion of second adapter portion 14.

In some embodiments and as described for first adapter portion 10, the second end of shock absorber 22 may be coupled to various portions of second adapter portion 14. For example and referring again to FIGS. 9-10, second adapter portion 14 may include a shock absorber mounting extension (e.g., shock absorber mounting extension 46) configured to receive the second end of the shock absorber. In some embodiments, shock absorber mounting extension 46 may be an integral portion of second adapter portion 14 or may be an extension coupled to first surface 26 of second adapter portion 14. In some embodiments, it may be desirable to couple the second end of the shock absorber to the second adapter portion at a point above the surface of the second adapter portion. Accordingly, second adapter portion 14 may include shock absorber mounting extension 46 configured to receive the second end of shock absorber 22. In this manner, the shock absorber mounting extension may provide desired shock absorbing capabilities without increasing the size of the entire second adapter portion.

In some embodiments, the length of first adapter portion 10 may be increased or decreased to provide for more or fewer positions along first adapter portion 10 to mount shock absorber 22. For example and as shown in FIG. 9, first adapter portion 10 may include various shock absorber mounting holes (e.g., shock absorber mounting holes 42) to e.g., accommodate a longer shock absorber, accommodate different shock absorber mounting positions, accommodate different orientations of shock absorbers, etc. However, it will be appreciated that the length of first adapter portion 10 may be increased or decreased for various reasons within the scope of the present disclosure.

It will be appreciated that embodiments of the present disclosure may allow individuals (e.g., adaptive skiers, handicapped skiers, physically disabled individuals, etc.) to adapt single-track vehicles (e.g., bicycles, ski bicycles, etc.) for use with aerial lifts or chairlifts.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. An apparatus comprising:
a first adapter portion configured to be removably coupled to at least a top frame portion of a ski bicycle extending between two ski coupling portions of the ski bicycle, each of which is connected to a ski, wherein the first adapter portion is removably coupled to the top frame portion of the ski bicycle using one or more clamping fasteners clamped around the top frame portion of the ski bicycle; and
a second adapter portion pivotably coupled to the first adapter portion; wherein a space formed between the first adapter portion and the second adapter portion is configured to receive at least a portion of a chairlift seat of a chairlift.

2. The apparatus of claim 1, further comprising:
a shock absorber positioned between and coupled to each of the first adapter portion and the second adapter portion.

3. The apparatus of claim 1, wherein the shock absorber is configured to maintain the second adapter portion at an angular position relative to the first adapter portion.

4. The apparatus of claim 1, wherein a first surface of the second adapter portion is configured to be coupled to a removably coupleable saddle.

5. The apparatus of claim 4, wherein the at least a portion of the chairlift seat is configured to be received underneath a second surface of the second adapter portion.

6. The apparatus of claim 1, wherein a first end of the second adapter portion is pivotably coupled to a first end of the first adapter portion.

7. The apparatus of claim 6, wherein the at least a portion of the chairlift seat is configured to be received in the space formed between a second end of the first adapter portion and a second end of the second adapter portion.

8. The apparatus of claim 1, wherein the chairlift is configured to lift the single-track vehicle by the combination of the first adapter portion and the second adapter portion.

9. An adapter system for adapting a ski bicycle for use on a chairlift, the adapter system comprising:
a first adapter portion configured to be removably coupled to at least a top frame portion of the ski bicycle extending between two ski coupling portions of the ski bicycle, each of which is connected to a ski, wherein the first adapter portion is removably coupled to the top frame portion of the ski bicycle using one or more clamping fasteners clamped around the top frame portion of the ski bicycle;
a second adapter portion pivotably coupled to the first adapter portion; and
a shock absorber positioned between and coupled to each of the first adapter portion and the second adapter portion; wherein
a space formed between the first adapter portion and the second adapter portion is configured to receive at least a portion of a chairlift seat of the chairlift.

10. The adapter system of claim 9, wherein the shock absorber is configured to maintain the second adapter portion at an angular position relative to the first adapter portion.

11. The adapter system of claim 9, wherein a first surface of the second adapter portion is configured to be coupled to a removably coupleable saddle.

12. The adapter system of claim 9, wherein the at least a portion of the chairlift seat is configured to be received underneath a second surface of the second adapter portion.

13. The adapter system of claim 9, wherein a first end of the second adapter portion is pivotably coupled to a first end of the first adapter portion.

14. The adapter system of claim 9, wherein the at least a portion of the chairlift seat is configured to be received in the space formed between a second end of the first adapter portion and a second end of the second adapter portion.

15. The adapter system of claim 9, wherein the chairlift is configured to lift the single-track vehicle by the combination of the first adapter portion and the second adapter portion.

16. An adapter system for adapting a ski bicycle for use on a chairlift, the adapter system comprising:
a first adapter portion configured to be removably coupled to at least a top frame portion of the ski bicycle extending between two lateral ski coupling portions of the ski bicycle, each of which is connected to a ski, wherein the first adapter portion is removably coupled to the top frame portion of the ski bicycle using one or more clamping fasteners clamped around the top frame portion of the ski bicycle; and
a first end of a second adapter portion pivotably coupled to a first end of the first adapter portion; wherein
a space formed between a second end of the first adapter portion and a second end of the second adapter portion is configured to receive at least a portion of a chairlift seat of the chairlift.

* * * * *